United States Patent

Vaughan et al.

[15] 3,667,044

[45] May 30, 1972

[54] EMERGENCY LUNAR COMMUNICATIONS SYSTEM

[72] Inventors: Otha H. Vaughan, Huntsville; Lee B. Malone, Athens, both of Ala.

[73] Assignee: The United States of America as represented by the Administrator of the National Aeronautics and Space Administration

[22] Filed: Nov. 3, 1970

[21] Appl. No.: 86,417

[52] U.S. Cl. ..............................325/4, 325/114, 343/6.5 R, 102/34.4

[51] Int. Cl. ..........................................................H04b 7/14

[58] Field of Search ..............................102/37.4, 35.4, 34.4; 343/6.8 R, 106 R, 18 B, 112 D; 325/113, 112, 115, 114, 4

[56] References Cited

UNITED STATES PATENTS

| | | | |
|---|---|---|---|
| 3,160,879 | 12/1964 | Downing et al. | 343/106 R |
| 2,519,123 | 8/1950 | Dwyer et al. | 102/34.4 |
| 3,344,428 | 9/1967 | Dewey et al. | 343/112 D |
| 2,871,344 | 1/1959 | Busignils | 343/18 B |
| 2,542,823 | 2/1951 | Lyle | 343/18 B |

*Primary Examiner*—Robert L. Griffin
*Assistant Examiner*—Barry Leibowitz
*Attorney*—L. D. Wofford, Jr., Charles C. Wells and John R. Manning

[57] ABSTRACT

A communication system for emergency use on the moon that includes three transceivers. One of the transceivers is carried by an astronaut and another is positioned at a basecamp. The system also includes a hand held launcher and rocket vehicle that is utilized by the astronaut to launch a third relay transceiver in an upward trajectory above the lunar surface. The relay transceiver is mounted in the rocket vehicle and functions to relay voice communications between the two transceivers located on the lunar surface.

5 Claims, 8 Drawing Figures

OTHA H. VAUGHAN
LEE B. MALONE
*INVENTORS*

BY Charles C. Wells

*ATTORNEY*

OTHA H. VAUGHAN
LEE B. MALONE
*INVENTORS*

BY Charles C. Wells

*ATTORNEY*

OTHA H. VAUGHAN
LEE B. MALONE
*INVENTORS*

BY Charles C. Wells
*ATTORNEY*

EMERGENCY LUNAR COMMUNICATIONS SYSTEM

ORIGIN OF THE INVENTION

The invention described herein was made by employees of the United States Government and may be manufactured and used by the Government for governmental purposes without the payment of any royalties thereon or therefor.

BACKGROUND OF THE INVENTION

1. Field of the Invention

The invention relates in general to communication systems and more particularly the invention relates to a line of sight communication system wherein a relay link is employed to extend the effective operating range of the system.

2. Discussion of Prior Art

The time is approaching when lunar exploration will have progressed to a point wherein an astronaut will no longer be able to rely on line of sight communication with his basecamp while carrying out his lunar exploration. Extensive effort has been exerted in the study and planning of how best to explore the moon and it has become apparent in these studies that it is desirable to provide the exploring astronaut with an emergency communication system that can be used if the astronaut's movements take him out of sight of his basecamp. This can occur if the exploration takes the astronaut over the lunar horizon from his basecamp or if he ventures down in a moon crater or the like.

S-band frequencies are used for communication between the earth and moon and VHF and UHF frequencies are used for communications between the lunar basecamp and an astronaut engaged in extra vehicular activities (EVA). At these high frequencies signal transmission is limited to substantially line of sight whether on earth or on the moon.

In a terrestrial environment low frequency radio waves are propagated about the earth by skywaves — reflecting the radio waves off the ionosphere, and by groundwaves. Skywaves cannot be generated on the moon since it has no atmosphere and very little is known of the propagation aspect of the lunar surface. However, the use of ground or surface waves is probably not practical for communications on the moon because of the excessive amounts of power required to transmit even a very short distance. Thus, line of sight transmissions using high frequencies is the most feasible approach to communications on the moon.

Numerous methods for extending line of sight communications has been considered and discarded as being too costly, particularly weight wise, or time consuming to develop. A lunar roving vehicle is being developed for use by the astronaut on EVA missions and it has been suggested that this vehicle be provided with a transciever capable of communicating with the earth who could then relay any emergency messages to the lunar basecamp. Such a transceiver, power supply and antenna would weight 50 or so pounds and would require a somewhat sophisticated pointing antenna. When one considers what it costs to put a pound on the moon it is obvious that this alternative is expensive.

A simple approach and one that will likely be used for limited EVA missions is to employ a small portable relay transceiver with an extensible antenna, that can be positioned on top of a lunar hill for relaying messages between the astronaut and basecamp when the hill prevents direct line of sight communications. Similarly, if the astronaut desired to descend into a crater or lunar canyon then the portable relay transceiver would be left on the edge of the crater in line of sight with the basecamp. So long as the astronaut kept the portable relay transceiver in sight he could communicate with his basecamp. The limitations of this solution are obvious. A major disadvantage is that once an exploration out of sight of the basecamp is underway, the astronaut's movements are still limited to those that are in line of sight of the portable transceiver. If the astronaut does venture beyond line of sight and for some reason become immobilized, by breaking a leg for example, or gets into a situation where he can neither retrace his footsteps or reach his basecamp without help, he is obviously in serious difficulty.

There are many systems described in the prior art wherein communication signals are relayed between two or more stations by some type of signal relay link. This relay link has been located in airplanes flying between the points to be linked or in satellites of various types in orbit around the earth. In ground systems the relay link has been positioned on a high tower, or on a mountain if available, so that the relay link can receive and transmit line of sight between the points being linked. However, so far as known none of these prior art systems provide for one of the transmission points or stations to be mobile, or provide a portable relay link which can be transported with the mobile transmission station and launched by means of a rocket to the desired elevation necessary for line of sight transmission to an over the horizon point.

SUMMARY OF THE INVENTION

The present invention is an emergency communication system for use on the moon that utilizes three transceivers. One transceiver is located at a lunar basecamp and a second portable transceiver is carried in the backpack of an astronaut. A third transceiver that functions as a relay link is mounted in a small rocket. The rocket is carried in a tubular container used as a launcher as well as carrying case. The container and rocket are carried by the astronaut and launched by hand should an emergency arise when the astronaut is out of sight of his basecamp. The rocket is launched in an upward trajectory and for some part of this trajectory the relay transmitter will be able to transmit and receive RF energy along a direct or line of sight path to the transceiver located on the lunar surface out of sight of one another. This relaying of radio signals will be distance limited by the height attained by the rocket, but in a lunar environment having reduced gravity forces a considerable height and thus a considerable transmission distance can be obtained with a small rocket.

BRIEF DESCRIPTION OF THE INVENTION

Figure 1:
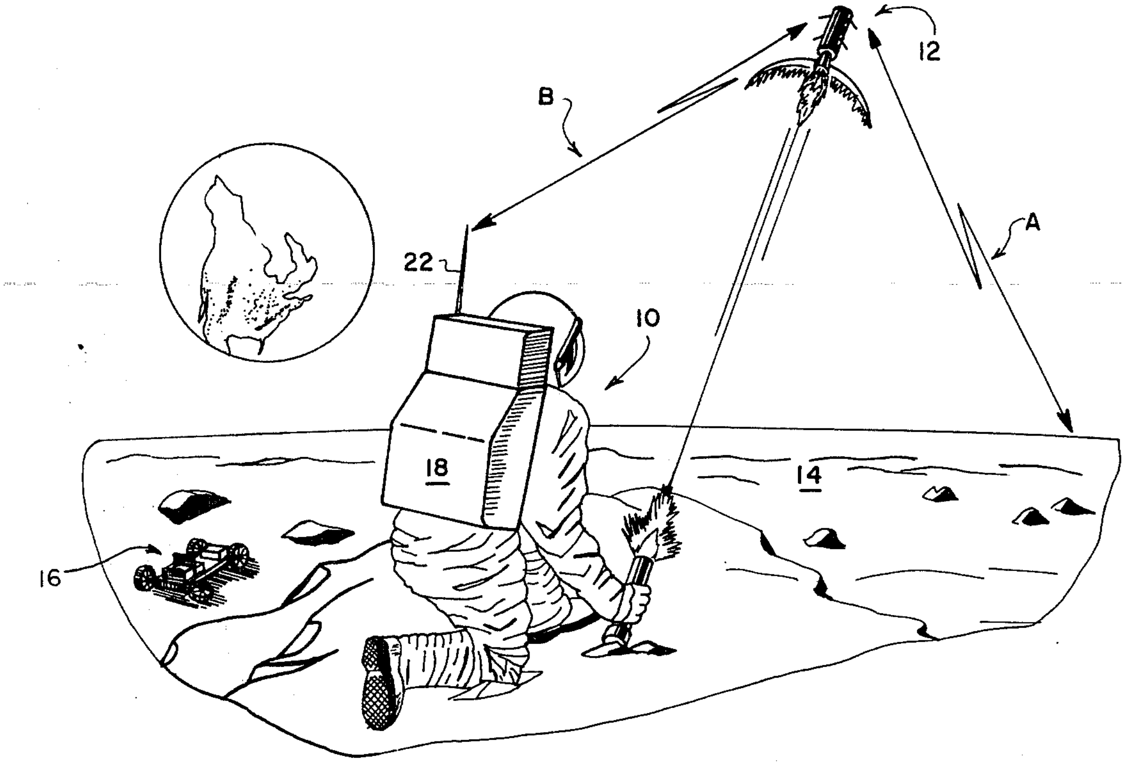
FIG. 1 is a pictorial view illustrating an astronaut launching the rocket carried transceiver away from the lunar surface.

As shown in FIG. 1 of the drawings an astronaut 10 has launched a spin stabilized rocket 12 in an upward trajectory from lunar surface 14. Parked in the distance is a lunar roving vehicle 16 which in the situation illustrated would have been used to transport the astronaut over the lunar horizon from his basecamp (not shown). The basecamp would be in the direction of arrow A used to indicate the direction of RF energy transmission from rocket 12 to the basecamp. The astronaut has a backpack 18 that includes a transceiver 20 (FIG. 2) which transmits via antenna 22 to rocket 12 in the direction indicated by arrow B.

Figure 2:
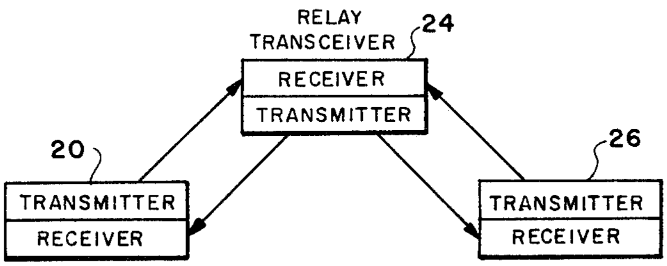
FIG. 2 is a schematic illustration of the system that illustrates the transmission paths between the three transceiver making up the system.

The three transceivers in the system and the direction of RF energy transmission therefrom are shown schematically in FIG. 2. Transceiver 20 is located in the astronaut's backpack, transceiver 24 is located in rocket 12 and transceiver 26 is located at the lunar basecamp. Transceiver 26 would normally be included as a part of the electronics in the lunar excursion module used to land on the lunar surface. Operation of the system so far as transmission of RF energy is concerned is apparent from FIG. 2; the astronaut with transceiver 20 transmits to relay transceiver 24 which relays the transmission to transceiver 26 at the lunar basecamp. Messages from the basecamp to the astronaut would be relayed back in the reverse direction.

Figure 3:
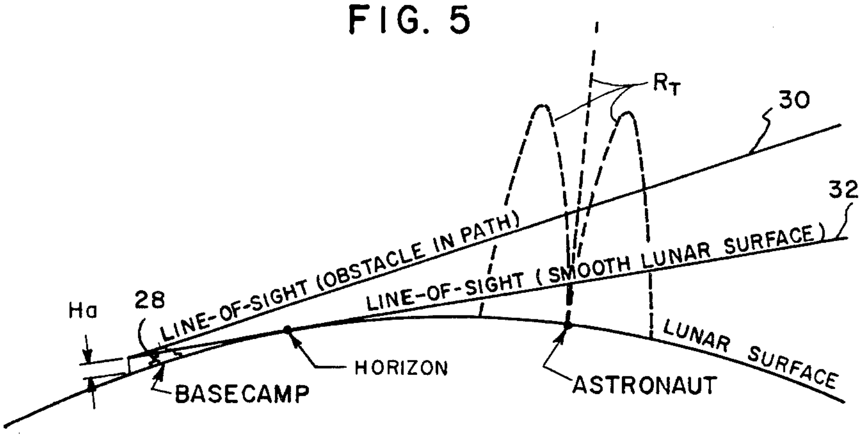
FIG. 3 illustrates how line of sight trajectory is achieved by lifting one transceiver to a desired elevation above the lunar surface.

Referring now to FIG 3 which illustrates that part of the rocket trajectory that can be utilized for relaying messages between the astronaut and his basecamp. Two instances are shown, one that would occur if there were no obstacles between the basecamp and astronaut and one where there is an obstacle. In FIG. 3 the relative positions of the astronaut, horizon and basecamp is illustrated and three possible rocket trajectories $R_T$ are shown in dotted lines. Two lines of sight are shown, one line of sight 30 that would be possible when there is an obstacle 28 in the path and another line of sight 32 where there is no obstacle. The distance $H_A$ is the height of an antenna used on the lunar excursion module.

The distance from the lunar excursion module antenna tip to the lunar horizon, when the antenna is 9 meters high, is 5.6 kilometers. This is under ideal conditions with no obstacles between the astronaut and basecamp so it can be appreciated that an exploring astronaut's range would be severely limited if restricted to an area that was in line of sight of his basecamp. The present invention can extend this range to 50 kilometers and more. The area below each of the lines of sights is a blind spot so transmission time is limited to that time when the rocket is above the lines of sight 30 or 32. Assuming the rocket attains a height of about 8,000 meters then the rocket would be above line 32 for 3 minutes, which time would be that available for communication between the astronaut and his basecamp. Such a time frame would be ample for emergency communications.

Figure 6:
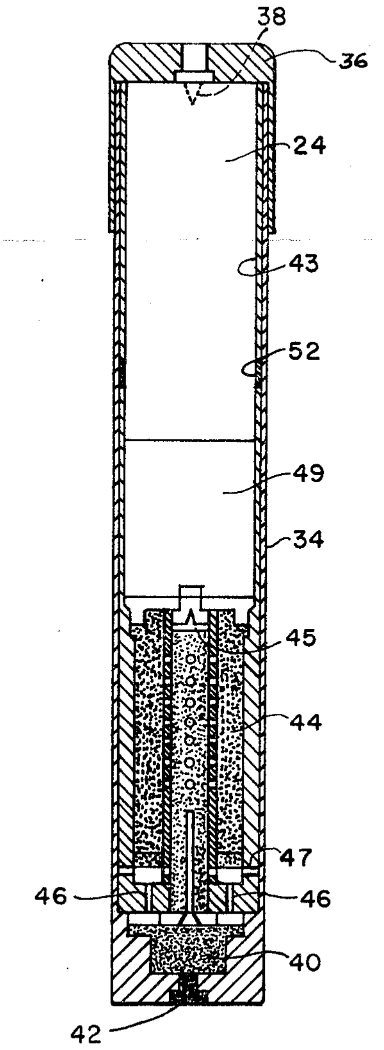
FIG. 6 is a cross-sectional view of the rocket vehicle housed in its container that serves as a launcher.
Figure 7:
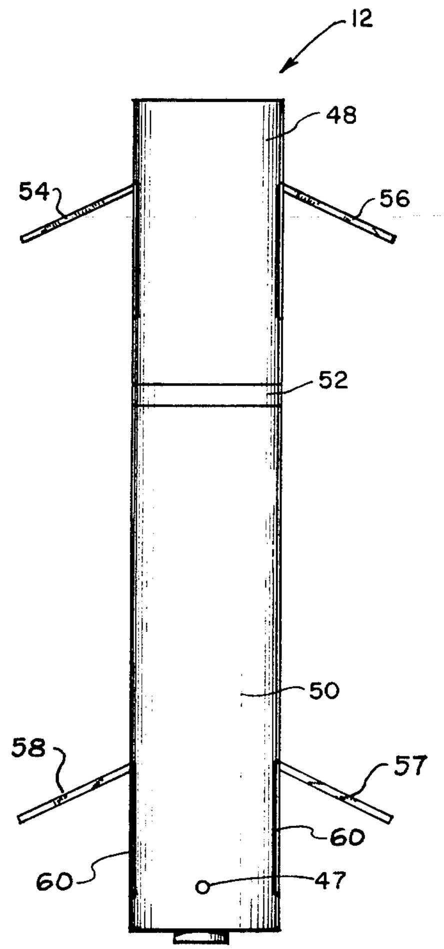
FIG. 7 is a view of the rocket vehicle removed from its container so that its antenna stubs are extended.
Figure 8:
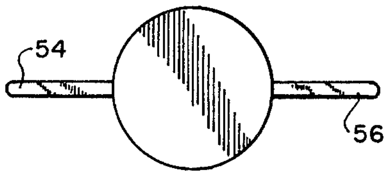
FIG. 8 is a view of the exhaust end of the rocket vehicle of FIG. 7.

In FIG. 6 the rocket is shown housed in container 34 that also serves as a launching tube. Container 34 is closed at one end by a cap 36 having a firing pin 38 mounted in the center thereof. An ejection charge 40 and primer 42 are mounted in the opposite end of the container for ejecting the rocket from container 34. Cap 36 is removed and placed on the other end of the container and the container is impacted a solid surface causing firing pin 38 to detonate primer 42 and ignite ejection charge 40 to eject the rocket from container 34. Rocket 12 includes a casing 43, the lower section of which houses a spin jet rocket motor 44 ignited by the ejection from container 34. Motor 44 exhausts through ports or nozzles 46. The lower end of the rocket motor is provided with side exhaust ports 47 through which gases from the rocket motor flow; imparting spin to the rocket for stabilization. Pressure from the burning propellant grain drives a firing pin 45 upward to energize a thermal battery 49 that powers transceiver 24. The thermal battery and transceiver 24 are housed in the upper end of casing 43.

Figure 4:
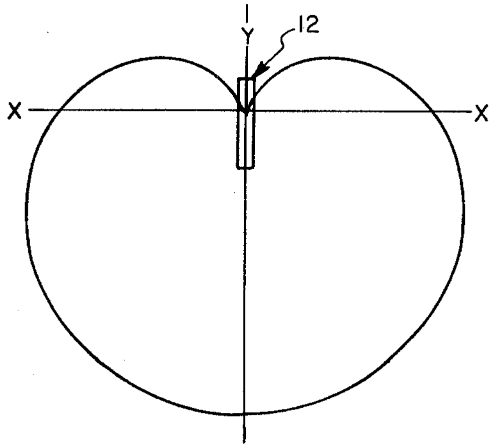
FIG. 4 illustrates a desirable antenna pattern for the relay transciever mounted in the rocket vehicle.

Casing 43 is divided into two electrically separate end sections 48 and 50 by a ring 52 of dielectric material. Casing 43 thus forms a dipole antenna and each end section has a pair of pop-out antenna stubs mounted thereon. Antenna stubs 54, 56, 57 and 58 are shown in a deployed position. Stubs 56 and 57 are nonmetallic and are used for counterbalancing purposes. The antenna stubs are fabricated from beryllium copper or other suitable spring material that can be folded down into slots, like slot 60 in casing 43, when the rocket is to be placed in container 34. When the rocket is ejected from container 34 the antenna stubs popout so as to provide a suitable antenna pattern. An antenna pattern substantially like that shown in FIG. 4 is desirable and this pattern or other desired pattern can be achieved by properly positioning an appropriate number of antenna stubs about casing 43.

Figure 5:
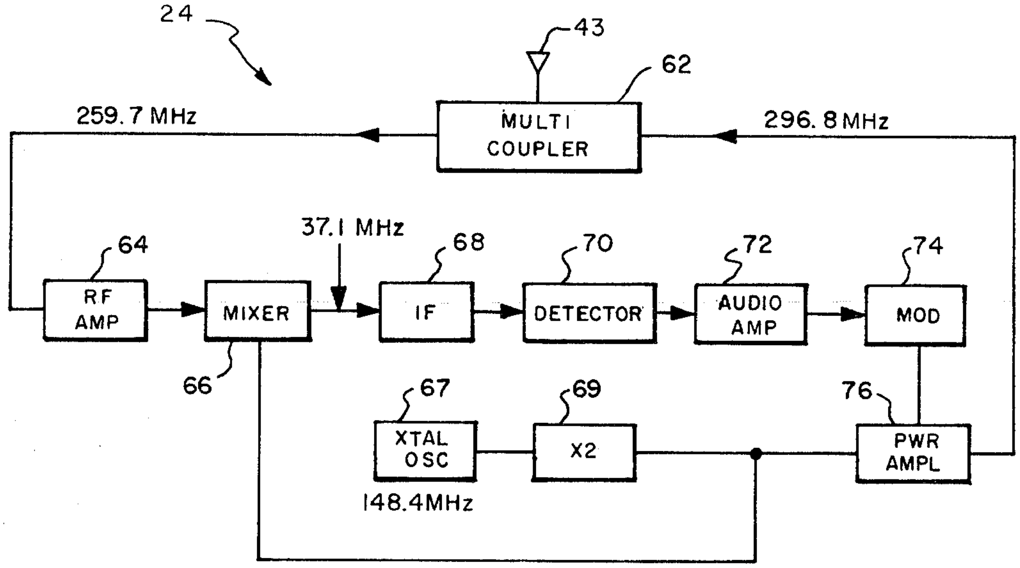
FIG. 5 is a block diagram of the relay transceiver mounted in the rocket vehicle.

A block diagram of a suitable transceiver used in the rocket is shown in FIG. 5. The transceiver is miniaturized to reduce the weight thereof and for this reason it is not considered a standard commercial item. However, it is state-of-the-art in that known circuitry and fabrication techniques are employed to construct the transciever. Rocket casing 43 forms a dipole antenna for transceiver 24 for receiving and transmitting RF energy.

In operation, antenna 43 will have two signals thereon, one at the transmitter frequency and one at the received frequency, i.e., the frequency of transmission from the lunar surface. Preferred frequencies are indicated in FIG. 5 of the drawings, but other suitable frequencies could be utilized. The signals from antenna 43 are processed by a multicoupler 62 which functions to separate or filter out the transmitter frequency (296.8 $MH_z$) from the receiver input. The separated received frequency (259.7 $MH_z$) is fed to a low noise RF amplifier 64 where it is amplified to a level sufficient for mixing purposes. In mixer 66 the output (296.8 $MH_z$) of crystal oscillator 67 and doubler 69 is combined or mixed with the received frequency to provide a 37.1 $MH_z$ output (296.8 $MH_z$ – 259.7 $MH_z$) which is fed to an IF (intermediate frequency) amplifier 68. The output of IF amplifier 68 is demodulated by A.M. detector 70 to remove the audio signal from the carrier wave. The output signal of the detector is then amplified by audio amplifier 72 to a level sufficient for modulation. Modulator 74 receives the audio amplifier output and uses this signal to amplitude modulate the output of power amplifier 76 to a proper level. The output carrier wave for the power amplifier is derived from crystal oscillator 67 and doubler 69. The power amplifier output is fed to antenna 43 through multicoupler 62.

The operation of the invention is deemed apparent from the foregoing discussion, but it will be briefly described to assure clarity of description. Assuming the astronaut has encountered difficulty and cannot transmit directly to his basecamp with his backpack transceiver because the basecamp is out of the astronaut's line of sight. The astronaut would grasp container 34, remove cover 36 and put it on the other end of container 34. The astronaut would then impact the cover against the lunar surface driving firing pin 38 into primer 42 to ignite ejection charge 40 and expel the rocket from container 34. Ejecting the rocket ignites the rocket motor and activates the thermal battery. Also, when the rocket leaves the launcher the antenna stubs deploy. Thus, by the time the rocket has reached a height that would place it in line of sight with the basecamp, the antenna stubs will be deployed, the thermal battery activated and the transceiver ready for operation to relay messages between the astronaut and his basecamp. The astronaut can carry a number of rockets and these can be launched successively as needed.

This completes the description of the invention. While a preferred embodiment for use on the moon has been disclosed the invention could have application on earth, possibly in military operations or as a rescue device, particularly if the system were modified to include direction finding apparatus.

What is claimed is:

1. An emergency communication system for transmitting signals between two points that are not in line of sight of one another comprising:

a first mobile transceiver means for use by a person encountering an emergency situation;

a second transceiver means adapted to be located at a basecamp for communicating with the person using said first transceiver means when an emergency is encountered;

a hand held rocket vehicle and launcher for use by said person using said first transceiver means to launch said rocket vehicle in an upward trajectory; and a relay transceiver means mounted in said rocket vehicle and activated on launch thereof, whereby said relay transceiver means can relay radio signals between said first and second transceiver means to permit the person using said first transceiver means to communicate with the basecamp;

said launcher is a tubular casing and said rocket vehicle is an elongated cylinder that fits slidingly into said launcher;

said rocket vehicle comprises, an elongated cylindrical casing that is divided into two electrically separated end parts by an integral ring of dielectric material so as to form a dipole antenna, a rocket motor mounted in one end of said cylindrical casing and said relay transceiver means mounted in the other end of said cylindrical casing, and said relay transceiver means being electrically connected to said dipole antenna.

2. The emergency communication system recited in claim 1 which further includes:

a plurality of flip out antenna stubs mounted on each end part of the dipole antenna in a position to give a desired antenna pattern.

3. In an emergency line of sight communications system of the type wherein a relay transceiver means is deployed between two remote transceivers, at least one of which is mobile; that are out of sight of one another to relay radio signals therebetween and thus extend the effective operating range of the system, the improvements therein comprising:

a small rocket adapted to be transported with the mobile one of the remote transceivers, said small rocket being encased in a cylindrical container that functions as a hand held launcher and carrying case;

said small rocket including a tubular casing that is electrically divided into two sections to form a dipole antenna; and a relay transceiver means mounted in one end of said tubular casing and electrically connected thereto for receiving and transmitting radio signals between the remote transceivers, said relay transceiver means being activated by launching of said rocket from said cylindrical container.

4. The communications system recited in claim 3 wherein said relay transceiver means includes a thermal battery means that is energized upon launch of said small rocket.

5. The communications system of claim 3 wherein each of said two sections of said tubular casing have pop-out antenna stubs attached thereto that deploy when the rocket is launched.

* * * * *